United States Patent [19]

Snyder et al.

[11] 4,046,584

[45] Sept. 6, 1977

[54] LIQUID CONCRETE ACCELERATING MIXTURES AND METHODS FOR USE THEREOF

[76] Inventors: Raymond C. Snyder, 5131 Princeton, Westminster, Calif. 92684; Paul F. Snyder, 14281 Hacienda Drive, Huntington Beach, Calif. 92647

[21] Appl. No.: 681,504

[22] Filed: Apr. 29, 1976

[51] Int. Cl.$^2$ ............................................. C04B 7/35
[52] U.S. Cl. ..................................... 106/90; 106/97; 106/315
[58] Field of Search ........................ 106/90, 315, 97

[56] References Cited

U.S. PATENT DOCUMENTS

| 2,793,128 | 5/1957 | Emhiser | 106/315 |
|---|---|---|---|
| 3,140,956 | 7/1964 | Kamlet et al. | 106/315 |
| 3,433,657 | 3/1969 | Pickering | 106/90 |
| 3,656,985 | 4/1972 | Bonnel et al. | 106/315 |
| 3,782,991 | 1/1974 | Burge | 106/315 |
| 3,850,651 | 11/1974 | Duncan et al. | 106/90 |

*Primary Examiner*—J. Poer
*Attorney, Agent, or Firm*—Fulwider, Patton, Rieber, Lee & Utecht

[57] ABSTRACT

There is disclosed a liquid accelerating additive for wet concrete which has a long shelf stability and which is ideally suited for use in shotcreting applications. The accelerating additive is a composition of sodium and potassium aluminates having the proportions of from 15 to about 40 weight percent alumina, and from 10 to about 25 weight percent of each of sodium and potassium, expressed as the oxides. The balance of the additive is water.

The invention also includes a method of shotcreting in which wet concrete is sprayed against the surface of a structure, typically the wall and/or ceiling of a subterranean tunnel or cavern while incorporating in the wet concrete mixture a sufficient quantity of the liquid accelerating additive to control the setting of the concrete coating. The liquid accelerating additive can be incorporated into the concrete mixture by blending it into the water ingredient of the concrete which is admixed with a premixed, dry, solid component that includes the cement and aggregate or, if desired, can be blended into the wet concrete as the concrete is sprayed onto the surface.

9 Claims, No Drawings

LIQUID CONCRETE ACCELERATING MIXTURES AND METHODS FOR USE THEREOF

BACKGROUND OF THE INVENTION

1. Field of the Invention

This invention relates to concrete accelerating additives and, in particular, to a liquid accelerating additive ideally suited for shotcreting applications.

2. Brief Statement of the Prior Art

Precise acceleration of the setting of concrete is critical in shotcreting applications wherein an anhydrous concrete mixture containing relatively large aggregate, e.g. ¼ inch or larger, is prepared outside a mine or tunnel and conveyed to a pneumatic dispenser inside the mine or tunnel. Water is then injected at the nozzle of the dispenser and the liquid concrete is sprayed at the freshly exposed walls of the mine or tunnel. An accelerating additive is incorporated in the concrete to control its setting time. If the concrete sets too fast, the aggregate in the concrete will have the tendency to fall out of the concrete when the concrete is sprayed onto the freshly exposed walls. This is known in the art as "rebound". If the concrete sets too slowly, the entire concrete mass will slump and/or fall from the walls. Thus, in shotcreting, it is necessary to have an accelerating admixture which provides the precise acceleration to the setting of the concrete.

Various accelerating additives have been developed for the setting of wet concrete or mortars in applications other than shotcreting and typical of these are calcium chloride and sodium carbonate. These materials are not satisfactory for use in shotcreting applications because they have an excessively high heat of hydration, resulting in premature drying of the concrete and cracking of the concrete surfaces and/or clogging of the spray nozzles used to apply the coating. Sodium aluminate of a regulated alkalinity has been suggested as a useful accelerating additive in U.S. Pat. No. 3,140,956, and the use of a metal aluminate in combination with an organic acid is suggested as an accelerating additive in U.S. Pat. No. 3,656,985.

While the sodium aluminate is superior in acceleration of concrete setting over other accelerating materials such as calcium chloride and sodium carbonate, the material is still not ideally suited for shotcreting applications. It is desirable to employ a liquid accelerating additive that can be continuously metered into the wet concrete mixture or the water ingredient thereof to provide a precise control over the setting of the wet concrete. Sodium aluminate also lacks an adequate shelf stability to be used, stored and handled as a liquid. Additionally, sodium aluminate does not provide adequate acceleration of the setting of wet concrete for optimum shotcreting applications.

BRIEF STATEMENT OF THE INVENTION

This invention comprises a liquid accelerating additive for wet concrete which is ideally suited for shotcreting applications. The liquid accelerating additive comprises a mixture of sodium and potassium aluminates having an overall composition of from 15 to about 40 weight percent alumina and from 10 to about 25 weight percent of each of sodium and potassium, expressed as the oxides. The balance of the accelerating additive is water. It has been found that the use of a liquid mixture of potassium and sodium aluminates achieves an adequate acceleration of the setting of wet concrete to permit optimum application of the shotcreting method. The mixture of sodium and potassium aluminates is also stable for indefinite storage.

The shotcreting method is practiced by incorporating in the wet concrete mixture of Portland cement, water and aggregate, a sufficient amount, generally from 1 to about 5 weight percent of the weight of cement, of the liquid accelerating additive. The liquid additive can be incorporated in the concrete by metering the liquid into a flowing stream of the wet concrete in the spray nozzle used for application of the wet concrete or, if desired, the liquid accelerating additive can be metered into the water stream that is admixed with a dry solid premix of the aggregate and cement.

The invention also includes the optional use of a minor quantity of an organic copolymer as an accelerator intensifier in the liquid accelerator additive. The organic copolymer that is employed is a copolymer of an alkyl vinyl ether with an alpha beta-ethylenically unsaturated dicarboxylic acid or anhydride thereof, typically the copolymer of methyl vinyl ether and maleic anhydride. Optional ingredients that can also be incorporated in the accelerating additive include pumping additives such as polyethylene oxide and the like which serve to lower the flowing viscosity of the concrete containing the additive.

DESCRIPTION OF PREFERRED EMBODIMENTS

The wet concrete accelerating additive of the invention comprises a mixture of alumina and sodium and potassium aluminates. The overall composition of the additive is from 15 to about 40, preferably from 20 to 30, weight percent alumina, from 10 to about 25, preferably from 12 to 20, weight percent of each sodium and potassium, expressed as the oxide, and the balance being water, present in an amount from 10 to about 60, preferably about 40 to about 50, parts. The liquid additive can be prepared by admixing in the proper proportions alumina and sodium and potassium hydroxides followed by heating of the mixture to a sufficient temperature and for adequate time to prepare a stable liquid. Typically, the mixture is heated at a temperature from 215° to about 275° F. from a period of from 15 to about 120 minutes. Preferred conditions include a temperature from 220° to about 240° F. and a time of heating from 20 to about 45 minutes.

If desired, the composition can be heated for an extended period of time, longer than the afore-indicated preferred time and/or at higher than the afore-indicated preferred temperature. The result of this intensified heating is to increase the viscosity of the liquid additive to a level where the liquid acquires a semi-solid consistency. In some instances, this may be preferred, e.g., when it is desired to incorporate in the composition an additional quantity of alumina which exceeds the solubility limits for alumina. The increased viscosity of the mixture resulting from the more intense heating produces a liquid product in which the alumina can be suspended in a supersaturated condition and retarded against sedimentation by the liquid's high viscosity. Accordingly, heating to the maximum of the aforeindicated temperatures and/or for the maximum of the aforeindicated times may be desirable in such instances.

The liquid accelerating additive can be incorporated in the concrete at a concentration from 0.5 to about 10, preferably from 1 to about 5, weight percent of the weight of cement of the concrete. The liquid accelerating additive can be incorporated in the concrete by admixing the liquid additive with the wet concrete while pumping or spraying the wet concrete in a shotcreting application. Because the additive is in a liquid state and is readily water soluble and/or dispersible, the material can be readily blended with the concrete without any extensive mixing time. Alternatively, the liquid additive can be blended with the water employed in preparation of the wet concrete and can thereby be admixed with a premixed blend of the dry solids for the concrete comprising, chiefly, Portland cement and aggregate.

The aggregate can be any available aggregate having a particle size range less than about 0.5 inch diameter, usually less than about 0.25 inch diameter. A typical mix of the concrete is an aggregate of from 45 to 60 weight percent washed, clean fine sand and 55 to 40 weight percent pea gravel. The concrete is prepared with from 600 to 800, typically 700, pounds cement per cubic yard. Water is admixed with the dry ingredients to provide a water to cement ratio of from 0.25 to about 0.4 or less, depending on the application.

Another embodiment of the accelerating additive includes from 0.1 to about 10, preferably from 3 to about 7, weight percent of an accelerating intensifyer which is a copolymer of a vinyl alkyl ether and a polymerizable dicarboxylic acid. Examples of suitable copolymers include the copolymers of alkyl vinyl ethers having alkyl groups of from 1 to about 5 carbons, e.g., methyl vinyl ether, ethyl vinyl ether, propyl vinyl ether, butyl vinyl ether, amyl vinyl ether, isopropyl vinyl ether, etc. The comonomer is a copolymerizable alkenyl dicarboxylic acid or anhydride thereof. Copolymerizable dicarboxylic acids are those having alpha, beta-ethylenically unsaturated structure, e.g., fumeric, maleic, itaconic, methafumeric acids or anhydrides. Typically, the dicarboxylic acid can have from 4 to about 7 carbon atoms. Of the aforementioned, the preferred additive is a methyl vinyl ether maleic acid or anhydride copolymer which is commercially available in low, moderate or high molecular weights ranging from about 100 to about 10,000 molecular weight units. Commercially available products which are useful in the invention comprise Gantrez 114 and Gantrez 149 which are products of the General Anilin and Film Co., 140 W. 51st St., New York, N.Y., and which have, respectively, molecular weights of 100 and 1,000.

The following examples will serve to illustrate the practice of the invention and demonstrate results obtainable thereby.

EXAMPLE I

An acceleration additive is prepared by mixing, in a 2 liter flask, 250 grams of alumina trihydrate, 300 grams each of sodium hydroxide and potassium hydroxide of 50 weight percent concentration, and 150 grams distilled water. The admixed ingredients form a turbid white suspension. The suspension is heated to 230° F. and maintained at that temperature for a period of about 30 minutes at which time the suspension becomes a clear liquid solution. The solution can be stored for prolonged periods without becoming turbid or forming any significant amount of precipitates.

EXAMPLE II

Concrete set times are determined using the ASTM Gilmore needle inspection procedure. The testing is performed by preparing for each sample, a mixture of 100 grams of the cement under investigation, 40 millimeters water and the indicated quantity of the liquid accelerating additive that is prepared in accordance with the recipe of Example I. For comparative purposes, mixtures of cement and water with an accelerating additive of a comparable concentration of sodium aluminate and another liquid accelerator of a comparable concentration of potassium aluminate were also prepared and tested. The following table summarizes the results:

TABLE I

| Test No. | Accelerating Additive | Concentration | Gilmore Needle Results Initial | Final |
|---|---|---|---|---|
| 1 | 24% NaOH 20% $Al_2O_3$ | 4% | 20 sec. | >30 min. |
| 2 | 15% NaOH 15% KOH 25% $Al_2O_3$ | 4% | 17 sec. | 10 min. |
| 3 | 20% KOH 20% $Al_2O_3$ | 4% | sec. | >30 min. |
| 4 | 10.5% NaOH 10.5% KOH 47.5% $Al_2O_3$ | 4% | 25 sec. | 6 min. |
| 5 | 10.5% NaOH 10.5% KOH 47.5% $Al_2O_3$ | 6% | 22 sec. | 6 min. |

The preceding data demonstrate that potassium or sodium aluminate, used alone, do not achieve an adequate set time, failing to reach a final Gilmore needle test reading within 30 minutes. This requirement is of primary importance in shotcreting applications where a rapid set is necessary to avoid sagging of wall and ceiling coatings applied with the concrete. In contrast, the combined use of potassium and sodium aluminates in the accelerating additive as prepared in the recipe of Example I achieved adequate set times, i.e., final Gilmore needle readings, within 30 minutes at the test concentrations of 4 weight percent.

EXAMPLE III

Similar testing is performed on a plurality of different type cements employing a range of from 2.5 to 12.5 weight percent of the accelerating additive, based on the weight of cement. In this testing, the test concrete is prepared by admixing 50 grams of the cement under investigation and sufficient distilled water containing the liquid accelerating additive to prepare a wet concrete mixture of 20 cc. The testing is performed with the cements and the accelerating additive described in Example I at the concentrations set forth in the following table:

TABLE II

| Test No. | Cement Type | Accelerator Concentration | Gilmore Needle Results Initial | Final |
|---|---|---|---|---|
| 6 | Andino Type V | 2.5% | 1 min. 55 sec. | >30 min. |
|   |   | 5.0% | 54 sec. | 9 min. 30 sec. |
|   |   | 7.5% | 54 sec. | 7 min. |
|   |   | 10.0% | 48 sec. | 5 min. |
| 7 | Yura | 2.5% | 28 sec. | 8 min. 30 sec. |
|   |   | 5.0% | 27 sec. | 8 min. |
|   |   | 7.5% | 36 sec. | 11 min. |
|   |   | 10.0% | 56 sec. | 7 min. |
| 8 | Sol | 2.5% | 3 min. | 24 min. |
|   |   | 5.0% | 2 min. 3 sec. | 17 min. 30 sec. |
|   |   | 7.5% | 1 min. 3 sec. | 9 min. 30 sec. |
|   |   | 10.0% | 1 min. 34 sec. | 10 min. 30 sec. |
| 9 | Rumi | 2.5% | 1 min. 44 sec. | 9 min. |
|   |   | 5.0% | 1 min. 44 sec. | 9 min. 30 sec. |
|   |   | 7.5% | 1 min. 44 sec. | 5 min. 30 sec. |
|   |   | 10.0% | 1 min. 5 sec. | 5 min. |
| 10 | Andino Type I | 2.5% | 2 min. 20 sec. | >30 min. |
|   |   | 5.0% | 3 min. 29 sec. | >30 min. |
|   |   | 7.5% | 2 min. 21 sec. | >30 min. |
|   |   | 10.0% | 54 sec. | 9 min. |
|   |   | 12.5% | 44 sec. | 5 min. |

TABLE II-continued

| Test No. | Cement Type | Accelerator Concentration | Gilmore Needle Results Initial | Final |
|---|---|---|---|---|
| 11 | Canadian | 2.0% | 1 min. 20 sec. | >30 min. |
|  |  | 4.0% | 40 sec. | 25 min. |
|  |  | 6.0% | 34 sec. | 18 min. |

The data demonstrates that the accelerating additive is effective for a wide variety of cements and, within the range of from about 2 to 12.5 weight percent of the cement, is effective in reducing the set time of concrete sufficiently to obtain final Gilmore needle readings of less than 30 minutes.

EXAMPLE IV

Compressive testing is performed on concrete containing the accelerating additive of the invention by blending 600 grams of the cement under investigation with 250 milliliters distilled water and 18 milliliters of the accelerating additive of Example I and, for comparative purposes, an additive of 20 weight percent alumina and 24 weight percent sodium hydroxide. The accelerating additives are blended with the distilled water which is added to the cement. After mixing, the wet concrete is poured into test cubes approximately 2 by 2 by 2 inch, permitted to cure, removed from the mold after acquiring a final set and destructively tested for compressive strength after 1, 7, 28 and 56 days. The data obtained are summarized in the following table:

TABLE III

| Test No. | Accelerating Additive | Compressive Strengths After |  |  |  |
|---|---|---|---|---|---|
|  |  | 1 day | 7 days | 28 days | 56 days |
| 12 | 15% NaOH 15% KOH 25% Al$_2$O$_3$ | 2075 | 4875 | 6250 | 6500 |
| 13 | 24% NaOH 20% Al$_2$O$_3$ | 2538 | 5200 | 6650 | 6875 |

The data summarized in the preceding table evidence that the accelerating additive of potassium and sodium aluminates achieves only slightly lesser compressive strength of concrete than achieved by the use of sodium aluminate alone. The data also evidence that as the concrete ages the difference in compressive strengths decreases and is only about 5 percent after 56 days.

EXAMPLE V

In another experiment, the liquid accelerating additive was modified to include 5 weight percent of each of Gantrez 114 and Gantrez 149, low and high molecular weight copolymers of methyl vinyl ether and maleic anhydride. Test cubes prepared from the concrete containing the accelerating additive with the copolymer were destructively tested after 1, 7 and 28 days and the results of the testing are set forth in the following table:

TABLE IV

| Test No. | Accelerating Additive | Compressive Strengths (psi) After: |  |  |
|---|---|---|---|---|
|  |  | 1 day | 7 days | 28 days |
| 14 | 15% NaOH 15% KOH 25% Al$_2$O$_3$ | 997 | 2825 | 4200 |
| 15 | 15% NaOH 15% KOH 25% Al$_2$O$_3$ | 800 | 3875 | 4825 |
| 16 | 5% Gantrez 114 5% Gantrez 149 24% NaOH 20% Al$_2$O$_3$ | 1000 | 3025 | 4750 |

The data of Table IV reveal that the copolymer ingredient significantly enhanced the compressive strength of the concrete.

The preceding examples are presented solely to illustrate a mode of practice of the invention and demonstrate results obtainable thereby. It is not intended that the invention be unduly limited by the exemplifier disclosure. Instead, it is intended that the invention be defined by the ingredients and steps, and their obvious equivalents set forth in the following claims.

What is claimed is:

1. An accelerated setting concrete which comprises:
   1. a liquid concrete composition containing cement, aggregate and water; and
   2. an accelerating additive therefore in an amount from 0.5 to 10 weight percent, sufficient to accelerate setting of said concrete and comprising on a weight basis:
      a. from 15 to 40 percent alumina
      b. from 10 to 25 percent sodium expressed as the oxide;
      c. from 10 to 25 percent potassium expressed as the oxide; and
      d. the balance being water.

2. The concrete of claim 1 wherein said accelerating additive comprises, on a weight basis:
   a. from 20 to 30 percent alumina
   b. from 12 to 20 percent sodium, expressed as the oxide;
   c. from 12 to 20 percent potassium, expressed as the oxide; and
   d. the balance being water.

3. The concrete of claim 1 wherein said accelerating additive is present in an amount from 1 to 5 weight percent.

4. The concrete of claim 1 wherein said accelerating additive also includes from 0.1 to about 10 weight percent of a copolymer of an alkyl vinyl ether having an alkyl group of 1 to about 5 carbons with an alpha, beta-ethylenically unsaturated dicarboxylic acid or anhydride thereof having from 4 to about 7 carbons.

5. The concrete of claim 4 wherein said copolymer is present at a concentration of from 3 to about 7 weight percent of said accelerating additive.

6. The accelerated setting concrete of claim 1 wherein said concrete contains from 600 to 800 pounds cement per cubic yard and contains an aggregate of from 45 to 60 weight percent sand and from 55 to 40 weight percent gravel.

7. The accelerated setting concrete of claim 6 wherein said water is present to provide a water to cement ratio of from 0.25 to about 0.4.

8. The concrete of claim 4 wherein said copolymer is methyl vinyl ether maleic acid or anhydride having a molecular weight from 100 to about 10,000.

9. The concrete of claim 7 wherein said methyl vinyl ether maleic anhydride copolymer is present as a mixture of equal weight amounts of copolymer having an average molecular weight of 100 and 1000 molecular units.

* * * * *